(12) United States Patent
Close et al.

(10) Patent No.: US 10,408,298 B2
(45) Date of Patent: Sep. 10, 2019

(54) ELASTOMERIC FORCE MITIGATING JOINT

(71) Applicant: United States Postal Service, Washington, DC (US)

(72) Inventors: Donald R. Close, Fairfax, VA (US); Scott R. Bombaugh, Burke, VA (US)

(73) Assignee: United States Postal Service, Washington, DC (US)

(*) Notice: Subject to any disclaimer, the term of this patent is extended or adjusted under 35 U.S.C. 154(b) by 320 days.

(21) Appl. No.: 15/457,221

(22) Filed: Mar. 13, 2017

(65) Prior Publication Data
US 2017/0184175 A1    Jun. 29, 2017

Related U.S. Application Data

(60) Continuation of application No. 14/670,155, filed on Mar. 26, 2015, now Pat. No. 9,689,459, which is a
(Continued)

(51) Int. Cl.
*F16C 11/06* (2006.01)
*F16C 11/08* (2006.01)
(Continued)

(52) U.S. Cl.
CPC .............. *F16F 15/08* (2013.01); *B65G 17/06* (2013.01); *B65G 17/066* (2013.01); *B65G 17/22* (2013.01);
(Continued)

(58) Field of Classification Search
CPC ....... F16C 11/086; F16C 11/083; F16C 11/08; F16C 11/04; F16C 11/00; B65G 17/385;
(Continued)

(56) References Cited

U.S. PATENT DOCUMENTS 3,337,232 A    8/1967   Peickii et al.
3,467,421 A    9/1969   Bentley
(Continued)

FOREIGN PATENT DOCUMENTS

CN    1032531 A      4/1989
CN    201737459 U    2/2011
(Continued)

OTHER PUBLICATIONS

International Search Report and Written Opinion for PCT/US2012/040926 dated Sep. 27, 2012.

*Primary Examiner* — Jonathan P Masinick
(74) *Attorney, Agent, or Firm* — Knobbe Martens Olson & Bear LLP

(57) ABSTRACT

The technology disclosed provides a joint for connecting carrier units together so as to dissipate and absorb axial forces experienced by the carrier units. The joint may be comprised of a joint housing and an elastomeric insert. The housing may be comprised of a body portion and a head portion and the head portion may include an annular flange in which the elastomeric insert is configured to be secured. The elastomeric joint is capable of absorbing and dissipating horizontal, rotational, and vertical forces experienced by the carrier units in non-linear travel along a track.

10 Claims, 11 Drawing Sheets

Related U.S. Application Data division of application No. 13/156,227, filed on Jun. 8, 2011, now Pat. No. 9,016,970.

(51) Int. Cl.

| | |
|---|---|
| *F16F 15/08* | (2006.01) |
| *B65G 17/06* | (2006.01) |
| *B65G 17/22* | (2006.01) |
| *B65G 47/96* | (2006.01) |
| *B65G 17/34* | (2006.01) |
| *B65G 17/30* | (2006.01) |
| *B65G 17/38* | (2006.01) |

(52) U.S. Cl.
 CPC .......... *B65G 17/345* (2013.01); *B65G 47/96* (2013.01); *B65G 47/962* (2013.01); *F16C 11/06* (2013.01); *F16C 11/08* (2013.01); *F16C 11/083* (2013.01); *B65G 17/30* (2013.01); *B65G 17/385* (2013.01); *Y10T 29/4984* (2015.01); *Y10T 29/49826* (2015.01); *Y10T 29/49872* (2015.01); *Y10T 403/32713* (2015.01); *Y10T 403/455* (2015.01); *Y10T 403/54* (2015.01)

(58) Field of Classification Search
 CPC ........ B65G 17/38; B65G 17/14; B65G 17/12; B65G 17/066; B65G 17/065; B65G 17/06; B65G 17/005; B65G 17/42
 See application file for complete search history.

(56) References Cited

U.S. PATENT DOCUMENTS

| | | | |
|---|---|---|---|
| 3,847,492 A | 11/1974 | Kennicutt et al. | |
| 4,157,227 A | 6/1979 | Hahle | |
| 4,334,698 A | 6/1982 | Ruf | |
| 4,984,928 A | 1/1991 | Domer | |
| 5,265,495 A | 11/1993 | Hubert et al. | |
| 5,374,038 A | 12/1994 | Hein | |
| 5,443,406 A | 8/1995 | Mondek et al. | |
| 5,560,593 A | 10/1996 | Hofmann et al. | |
| 5,680,924 A | 10/1997 | Maier et al. | |
| 5,682,798 A * | 11/1997 | Malone | F16C 11/0657 403/70 |
| 5,839,846 A | 11/1998 | Shimada et al. | |
| 5,996,981 A * | 12/1999 | Dilling | B60G 7/02 267/153 |
| 6,070,862 A * | 6/2000 | Miyamoto | F16F 1/387 267/140.12 |
| 6,378,853 B1 * | 4/2002 | Kammel | F16F 1/387 267/141.2 |
| 6,386,309 B1 * | 5/2002 | Park | B60K 5/1216 180/291 |
| 6,575,441 B2 * | 6/2003 | Lefebvre | B60G 7/02 267/141 |
| 6,830,492 B1 | 12/2004 | Magee et al. | |
| 6,854,750 B2 * | 2/2005 | Carlstedt | B60G 11/60 267/276 |
| 7,252,298 B2 * | 8/2007 | Hughes | B60G 7/02 267/141 |
| 7,306,209 B2 * | 12/2007 | Vossel | F16F 13/14 267/140.13 |
| 7,478,803 B2 | 1/2009 | Lee | |
| 7,635,117 B2 * | 12/2009 | Heuer | F16F 1/3821 267/140.2 |
| 7,735,812 B2 * | 6/2010 | Fitzgerald | F16F 15/08 267/141 |
| 8,628,101 B2 * | 1/2014 | Koide | B60G 3/20 267/141 |
| 8,678,409 B2 * | 3/2014 | Koide | B60G 3/20 280/124.11 |
| 8,684,621 B2 * | 4/2014 | Forthaus | F16C 7/02 403/134 |
| 9,016,970 B2 * | 4/2015 | Close | B65G 17/22 403/132 |
| 9,439,513 B2 * | 9/2016 | Walser | A47C 3/026 |
| 9,562,583 B2 * | 2/2017 | Kondor | F16F 1/3835 |
| 2003/0230866 A1 | 12/2003 | Lee | |
| 2005/0191120 A1 | 9/2005 | Oellers | |
| 2011/0013975 A1 | 1/2011 | Orsolini | |

FOREIGN PATENT DOCUMENTS

| | | |
|---|---|---|
| CN | 201746100 U | 2/2011 |
| DE | 43 07 559 A1 | 9/1994 |
| DE | 198 13 721 A1 | 10/1999 |
| EP | 0 671 349 A1 | 9/1995 |
| EP | 1 659 079 A1 | 5/2006 |
| EP | 1 798 431 A1 | 6/2007 |
| GB | 273 367 A | 7/1927 |

* cited by examiner

ELASTOMERIC FORCE MITIGATING JOINT

CROSS-REFERENCE TO RELATED APPLICATIONS

This application is a continuation of U.S. patent application Ser. No. 14/670,155, filed Mar. 26, 2015, which is a divisional of U.S. patent application Ser. No. 13/156,227, filed Jun. 8, 2011, now U.S. Pat. No. 9,016,970, the entire disclosures of which are incorporated by reference herein.

BACKGROUND

Field of the Development

This application relates generally to conveyor systems for transporting objects, and more specifically refers to methods and devices for dissipating forces in conveyor joints.

Description of the Related Art

Conveyor systems are useful in selecting, sorting, and transporting objects from one location to another. A conveyor system may be made up of individual conveyor units, or "carriers," which are connected together by joints to make up a conveyor train. The conveyor train typically rides on a track in a continuous loop. An individual carrier may be equipped with a discharge device such as a motor-driven cross-belt, a tilt-tray, or a diverter paddle, etc. for discharging objects carried atop the carrier in a direction transverse to the direction traveled by the conveyor train. The discharge device is programmed to activate at a pre-programmed time and location along the conveyor track based on, for example, the characteristics of the object being transported.

A conveyor system may be employed in package sorting facilities, and as such will often travel a circuitous route through the facility, receiving and distributing packages at multiple locations. In the process, a conveyor system may be required to travel through multiple curves of varying radii and additionally travel up and down inclines of varying elevations. Non-linear travel in a conveyor system creates difficulty in establishing and maintaining a constant speed for the conveyor train. As a result, the non-linear travel may also cause timing irregularities for the discharge devices in discharging the objects being carried.

Also, conveyor systems with curved tracks and elevation changes tend to experience significant mechanical failure at a higher frequency than do conveyor systems with straight tracks alone. Such mechanical failure necessitates the need for frequent stoppage of the system for maintenance and repair. The joints connecting the conveyor carriers are particularly vulnerable to flexural fatigue in non-linear conveyor systems. The joints provide a point of connection between the conveyor carriers and thus facilitate turning of the conveyor train through the curves. Much of the axial forces experienced by the conveyor system are, thus, focused on the joints. The axial forces may cause flexural fatigue in the joints, leading to deterioration of the structural integrity of the metal joint components. When the joints deteriorate, many of the joint components may become loose or fit poorly together and require frequent repair. Joint deterioration may also cause the joint components to repeatedly collide together, causing high-decibel noise levels unsuitable for workers attending the conveyor system.

An inability of the joints to absorb the axial forces experienced in a non-linear conveyor system leads not only to break down of the joints themselves, but to transmission of the axial forces from the joints into the frame of the conveyor system. The transmitted forces may cause damage to the track and conveyor system support structure. In this manner, a non-linear conveyor system has historically required longer and more frequent maintenance stoppage time, resulting in costly repairs to the conveyor track and conveyor carriers, not to mention the opportunity cost of not being able to run the conveyor system as long as one would ideally like.

Previous attempts at mitigating the forces exhibited in non-linear conveyor systems have included the use of slip joints disposed between conveyor carriers at periodic locations along the carrier train. For practical reasons, the slip joints cannot be used between each individual conveyor carrier without causing slack to build up in the conveyor train. Thus, the forces experienced by the majority of individual joints connecting the conveyor carriers are not dissipated even with the use of slip joints.

Another attempt at mitigating the forces in non-linear conveyor systems has included the use of ball joints to connect the conveyor carriers. Often Teflon or other coating materials have been placed over the ball of the ball joint or on the inside of the housing to protect the joint from frictional forces that the joint experiences in a non-linear conveyor system. The use of a ball joint has proven inadequate, however, in dealing with the forces experienced in the non-linear conveyor system because the ball joint is unable to dissipate the axial forces experienced by the joint. The Teflon coating simply acts as a small buffer between the housing and ball portions of the ball joint to prevent wear on the ball. The joint is unable to dissipate and control the axial forces experienced by the joint in a curve in a non-linear conveyor system. The coating material is liable to wear out quickly and need frequent replacement. Furthermore, the axial forces experienced by the joints are still transferred to the overall conveyor system, leading to system damage and potential timing irregularities.

SUMMARY OF THE INVENTION

Some embodiments of the disclosure provide for a joint for connecting carrier units, including a joint housing and an elastomeric insert. The joint housing includes a head portion on a first side comprising an annular flange. The annular flange includes interior walls that define a hole and a counter bore. The joint housing also includes an elongated body on a second side, wherein the body comprises a bore extending longitudinally therethrough. The elastomeric insert can be positioned inside the counter bore of the annular flange.

The cross-sectional diameter of the counter bore can be greater than the diameter of the hole in the annular flange. The elastomeric insert can include an outer ring and an inner ring, wherein the inner and outer rings are connected together by supports. The joint may further include a front and a rear gap in the elastomeric insert, each gap defined by the inner walls of the outer ring and the outer walls of the inner ring. The elastomeric insert may include a bumper extending from the inner elastomeric ring and positioned in one of the front or rear gaps and the elastomeric insert may include an elastomeric knob extending from an outer surface of the outer ring. The elastomeric insert can be configured in the counter bore to orient the bumper towards a front side of the annular flange and the knob can be configured to fit into a connecting lumen in a rear interior wall of the counter bore.

Some embodiments of the disclosure provide a bearing, the bearing having a base portion and a tubular portion extending from the base portion, wherein the bearing is configured to be positioned inside the counter bore of the annular flange and the elastomeric element configured to fit around the tubular portion of the bearing. A bottom portion of the elastomeric insert can be secured to the base portion of the bearing and a top portion of the elastomeric insert can be secured to a top of the counter bore of the annular flange.

Some embodiments of the disclosure provide a method of dissipating forces between carrier units by connecting a first carrier unit to a second carrier unit using an elastomeric joint, receiving a force on the carrier units, and dissipating the force in the elastomeric joint. The elastomeric joint can include a joint housing and an elastomeric insert. The step of connecting the first carrier unit to the second carrier unit can include connecting a first post on the first carrier to an annular flange on the elastomeric joint and connecting a second post on the second carrier to a longitudinal bore in the elastomeric joint.

The step of dissipating the force in the elastomeric joint can further include receiving the force experienced by the first carrier at the first post at the elastomeric insert and the elastomeric insert is configured to dissipate the force by elastically adjusting within the joint housing and by absorbing the force.

The method of dissipating forces between carrier units can further include connecting a plurality of carrier units using a plurality of elastomeric joints, wherein the plurality of carrier units comprise a conveyor train. The step of receiving a force can be a result of the plurality of carrier units traveling in a curve. The step of receiving a force can be a result of the plurality of carrier units traveling on an incline.

Some embodiments of the disclosure provide a joint for dissipating forces in carrier units including means for connecting conveyor units, means for receiving a force on the conveyor units, means for dissipating the force within the connecting means. The connecting means can be an elastomeric joint and the dissipating means can be elastomeric insert.

DETAILED DESCRIPTION OF EMBODIMENTS OF THE DEVELOPMENT

The features, aspects and advantages of the present development will now be described with reference to the drawings which are intended to be within the scope of the embodiments disclosed herein. These and other embodiments will become readily apparent to those skilled in the art from the following detailed description of the embodiments having reference to the attached figures, the development not being limited to any particular embodiment(s) herein disclosed.

The technology described herein provides a joint for connecting conveyor carriers together as a conveyor train. The conveyor train travels on a track along a circulating path as part of an overall conveyor system. In the context of an exemplary embodiment of a sorting facility such as is used in a parcel sorting facility, the conveyor system includes one or more package pick-up locations and one or more package discharge locations. An individual carrier may include a discharge device for discharging packages at a programmed time and location. Based on the characteristics of a particular package (e.g., size, delivery destination, parcel method, etc.), the discharge device of the carrier on which the package is riding will be activated to discharge the package from the carrier at a programmed location along the path of the conveyor train. Thus, the conveyor train will preferably operate at a consistent and accurate speed in order to accurately discharge the packages off the conveyor carriers at the correct location. If the speed of the train becomes inconsistent (speeding up or down) or travels at an actual speed different than the programmed speed, the packages may be discharged at the incorrect location.

The operational demands of a package sorting facility may require that the conveyor system operate continuously for days or weeks on end, without stoppage time for maintenance. Furthermore, when maintenance is required, the stoppage time should be minimal and the actual maintenance performed should ideally be minimal, not requiring significant repairs.

The basis for the existence of the forces experienced by the joints connecting the conveyor carriers in a non-linear conveyor system are disclosed herein, as are methods and devices for dissipation of the forces.

Figure 1:
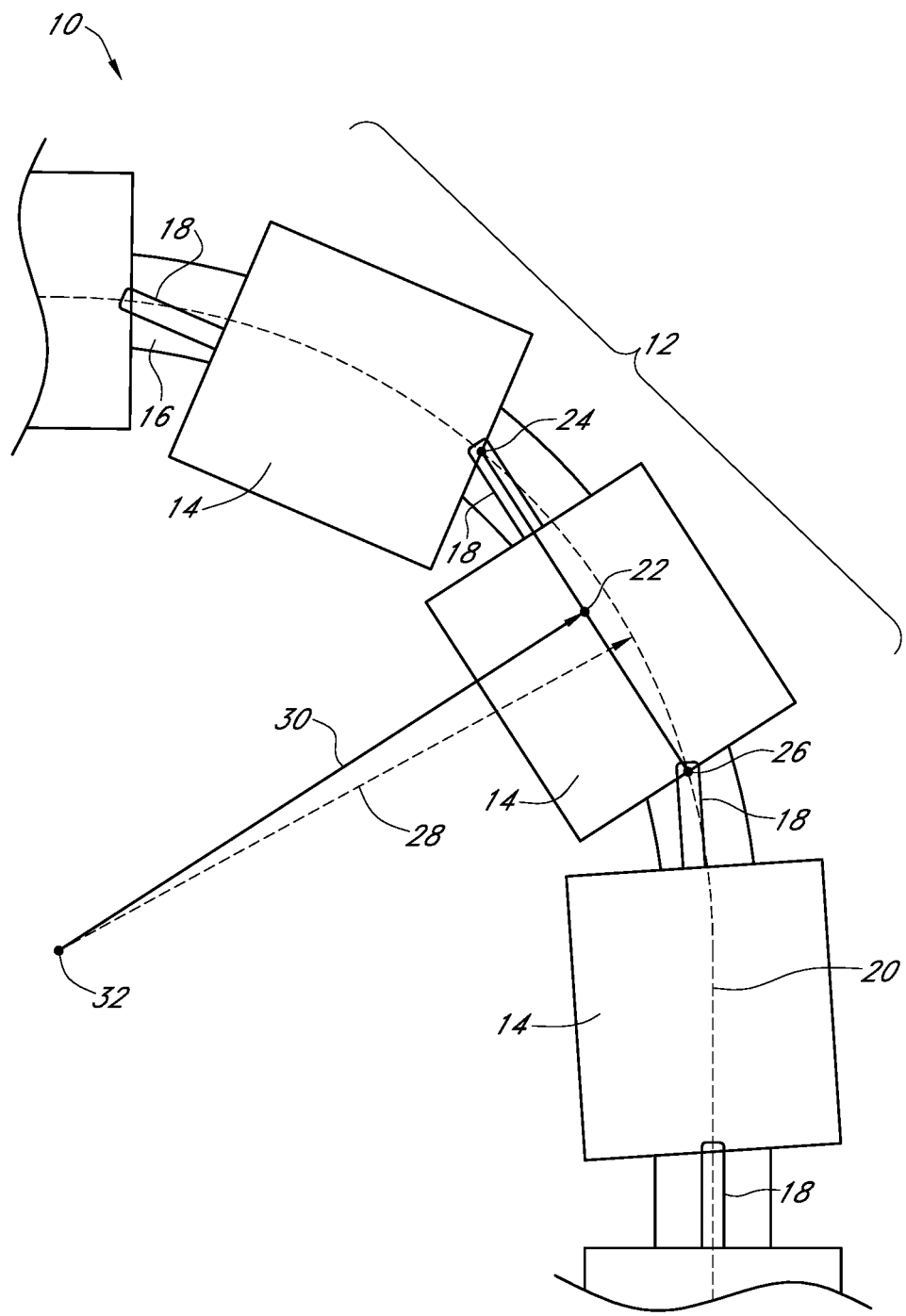
FIG. 1 is top plan view of certain components of a conveyor system, in which a conveyor train made up of multiple conveyor carriers is traveling around a curve in the conveyor track.

FIG. 1 is a top plan view of certain components of a conveyor system 10, in which a conveyor train 12 made up of multiple conveyor carriers 14 is traveling around a curve in a conveyor track 16. The conveyor carriers 14 are connected together by joints 18. Historically the joints 18 connecting the conveyor carriers 14 have been rigid connections (such as ball joints) or have included periodic slip joints between the conveyor carriers 14. Each individual carrier 14 is of a certain rectilinear length and thus individually cannot conform to the curvature 20 of the track 16. As a result, as a conveyor carrier travels in the curve, the distance 28 from the center of the curvature 32 to the track curvature 20 is greater than the distance 30 from the center of the curvature 32 to the center midpoint 22 of the individual carrier 14 traveling in the curve. Thus, the front and rear midpoints 24, 26 of the conveyor carrier 14 are at a greater distance from the center of curvature 32 than is the center midpoint 22 of the conveyor carrier 14.

Being at a greater distance from the center of curvature 32, the front and rear midpoints 24, 26 of the carrier must accelerate relative to the center midpoint 22 of the carrier while traveling through the curve. This relative acceleration at the front and rear midpoints 24, 26 induces substantial forces on the conveyor carriers 14, particularly at the joints 18 near the front and rear midpoints 24, 26. Likewise, as the conveyor carriers 14 exit the curve, the conveyor carriers 14 will then decelerate as they enter the linear portion of the track 16. The forces experienced by the conveyor carriers 14 at the joints 18 are experienced primarily in an axial direction, tangential to the radius of curvature.

The forces that the conveyor carriers 14 experience, particularly at the joints 18, as they enter and exit the curve, are not isolated just to the conveyor carriers 14 traveling through the curve at that time, but instead are propagated through the train 12 of, what have historically been, rigidly-connected conveyor carriers 14. Thus, even conveyor carriers 14 now on a straight portion of the track 16 still experience the propagating forces. In this manner, travel of the conveyor train 12 through a single curve can be the cause of oscillating horizontal forces propagating through the entire conveyor train 12. The forces propagating through the conveyor train 12 also create high-decibel noise levels in the conveyor system 10, noise levels which are potentially harmful to operations staff.

Thus, the potential for inaccurate timing and the structural damage experienced in a curved conveyor system 10 are often a result of the oscillating axial forces which result from the acceleration and deceleration experienced by the conveyor carriers 14 as they enter and exit the curve. With an understanding of the distribution of forces within the conveyor system 10, a focus on alleviating the forces is possible. The present disclosure provides devices and methods for mitigating and dissipating the forces experienced by the conveyor carriers 14, allowing for a consistent and accurate speed of the conveyor train and reduced stoppage time and reduced maintenance costs.

Figure 2:
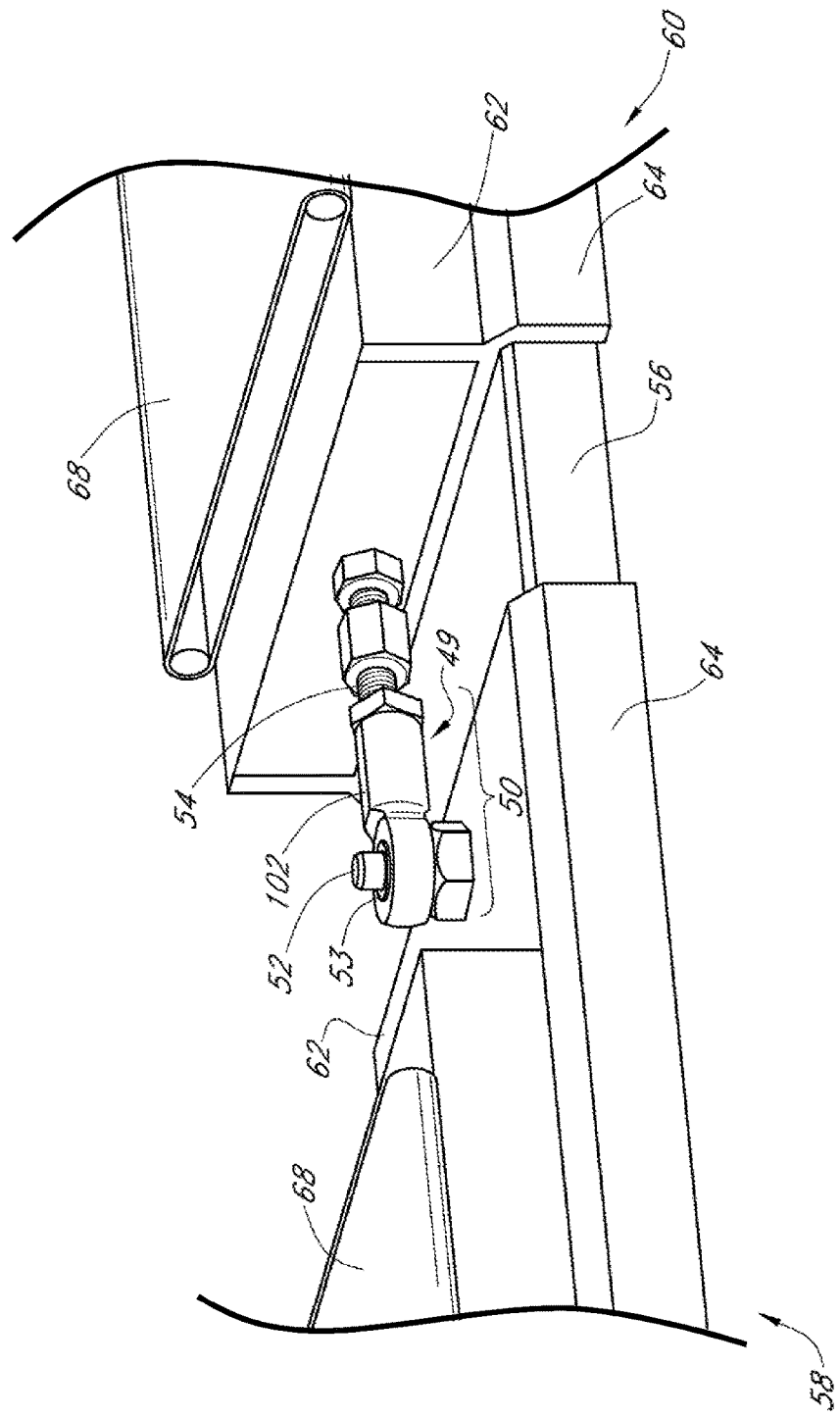
FIG. 2 is a perspective view of one embodiment of an elastomeric joint connecting two conveyor carriers.

FIG. 2 provides a perspective view of an embodiment of an elastomeric joint 50 disclosed herein. The elastomeric joint 50 can be positioned to connect a front carrier 58 and a rear carrier 60. The elastomeric joint 50 can be attached to a vertical post 52 located on the conveyor base 62 of the front carrier 58 and to a horizontal post 54 located on a conveyor base 62 of the rear carrier 60. The horizontal post 54 on the rear carrier 60 may be threaded to receive a threaded bore (not shown) on the elastomeric joint 50. Each conveyor carrier 58, 60 may further include a discharge device 68 and a conveyor saddle 64 as part of the carrier base 62. The conveyor saddle 64 fits around a conveyor track 56 on which the conveyor carriers 58, 60 travel.

Figure 3A:
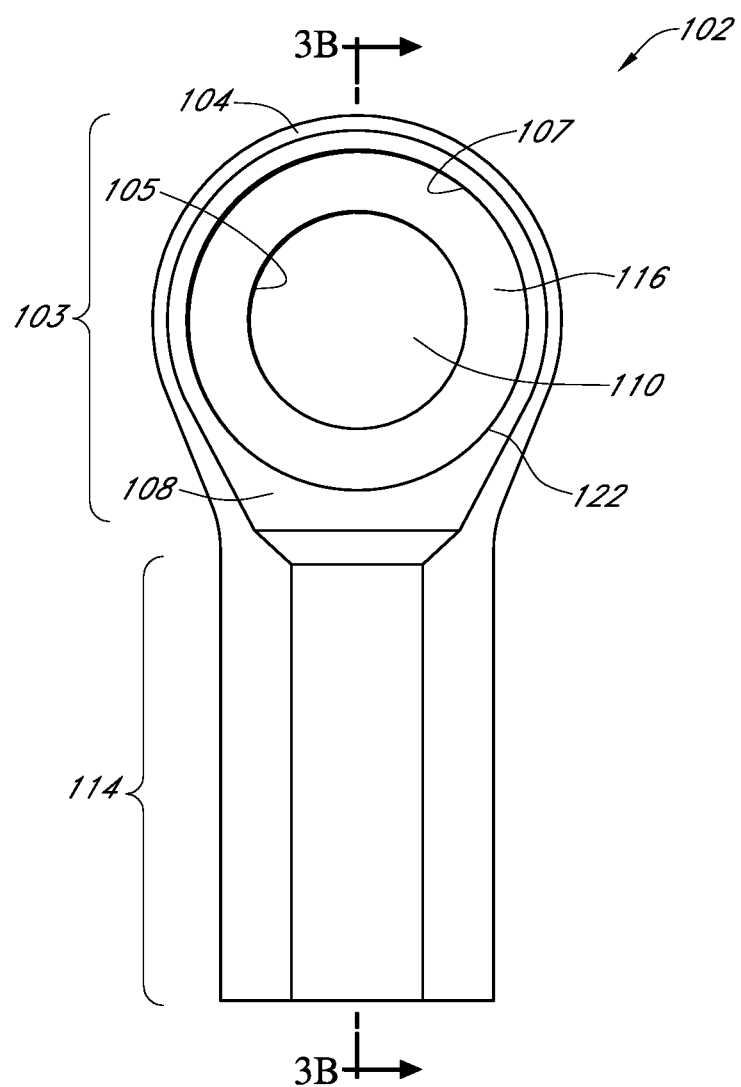
FIG. 3A is a bottom plan view of an embodiment of the joint housing.

The elastomeric joint 50 disclosed herein is comprised of a joint housing 102 and an elastomeric insert 53, which is partially visible in FIG. 2. A bottom portion 49 of elastomeric joint 50 faces downwards towards the conveyor track 56. FIG. 3A is a bottom plan view of an embodiment of the joint housing 102. It is noted that the bottom plan of the joint housing 102, as viewed in FIG. 3A, corresponds to the side of the elastomeric joint 50 facing down towards the track 56 in FIG. 2. The joint housing 102 includes a linear body portion 114 and a rounded head portion 103. The head portion 103 includes an annular flange 104, the annular flange 104 having interior walls 105 that define a longitudinal hole 110. The annular flange 104 also comprises interior walls 107 that define a counter bore 122 beginning on a bottom section 108 of the annular flange 104 and extending through the annular flange 104 to culminate at an annular top 116. The counter bore 122, is of a diameter greater than the diameter of the hole 110 in the annular flange 104. In this manner, the annular top 116 of the counter bore 122 circumscribes the hole 110 in the annular flange 104.

Figure 3B:
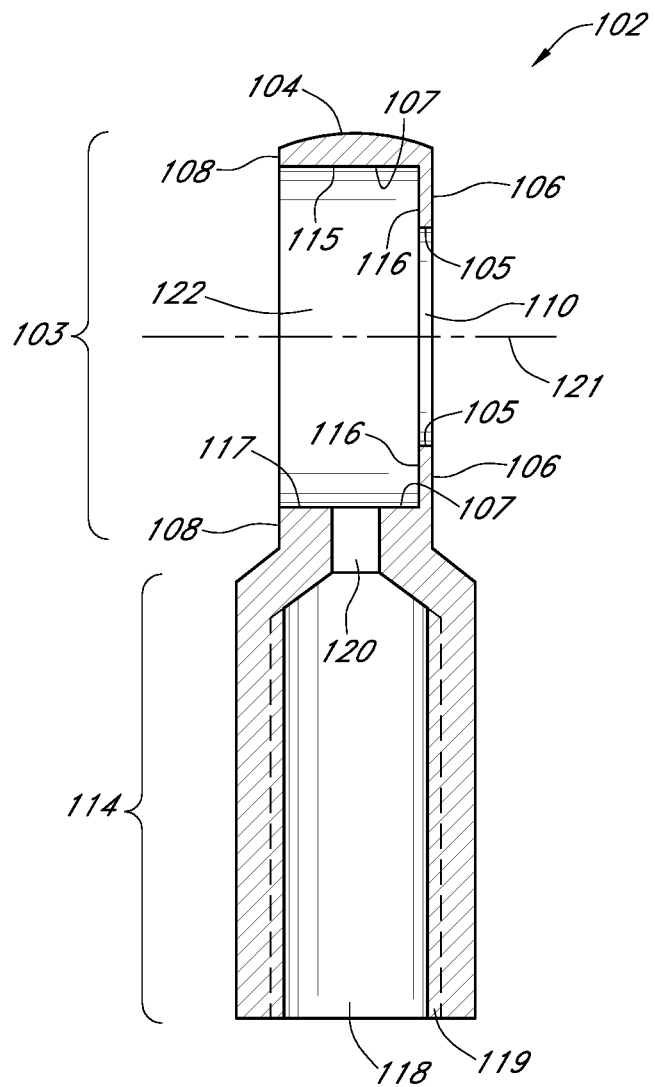
FIG. 3B is a cross-sectional side view of the joint housing taken along line 3B of FIG. 3A.

FIG. 3B is a cross-sectional side view of the joint housing 102 taken along line 3B of FIG. 3A. Visible in FIG. 3B is a bore 118 formed within the joint housing 102 so as to extend longitudinally through the body portion 114 of the joint housing 102. The bore 118 may comprise threads 119 extending along the interior face of the bore 118 in the body portion 114. The threads 119 allow the joint housing 102 to be threadably connected to the horizontal post 54 on the rear carrier 60, which may also be threaded along its mating surface.

The joint housing may also include a connecting lumen 120 passing from the bore 118 through the body portion 114 and the flange 104 to the counter bore 122. The annular flange 104 comprises a top section 106 and a bottom section 108. The interior walls 105 of the annular flange in the top section 106 define the longitudinal hole 110. The counter bore 122 may be a circular shape about a longitudinal axis 121 in order to fit a circular elastomeric insert discussed below, or may be of any other necessary shape to conform to the shape of the desired elastomeric insert. The counter bore 122 comprises a front interior wall 115 and a back interior wall 117. The back interior wall 117 of the counter bore 122 may include the connecting lumen 120 extending therethrough to the bore 118 in the body portion 114 of the joint housing 102. Shown in FIG. 3B is the annular top 116 to the counter bore 122, circumscribing the hole 110 located in the top section 106 of the annular flange 104. The joint housing 102 may be comprised of stainless steel, aluminum, titanium, or other suitable metal or alloy.

Figure 4A:
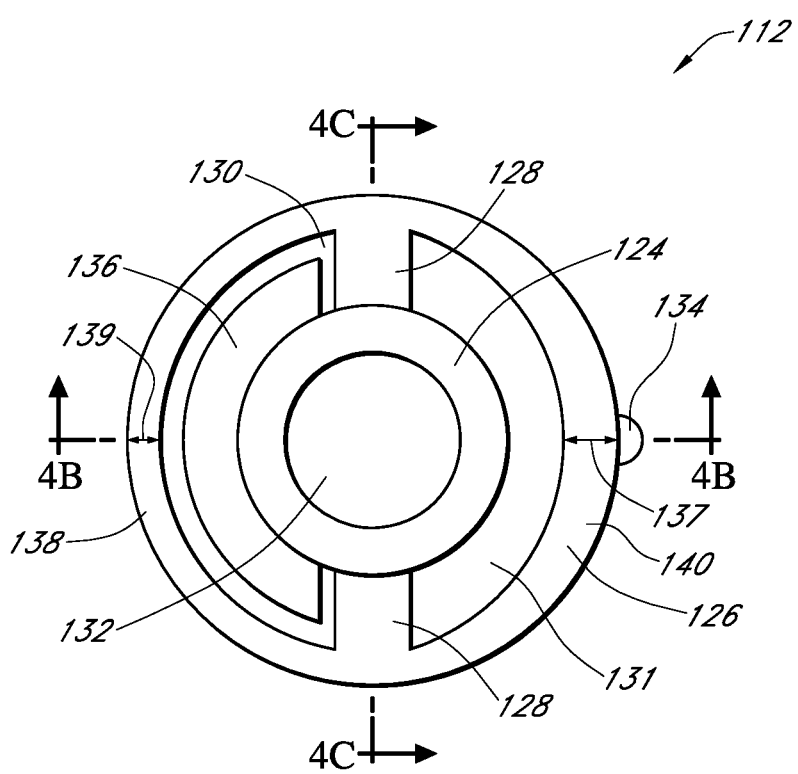
FIG. 4A is a top plan view of one embodiment of an elastomeric insert.

FIG. 4A provides a top plan view of an embodiment of an elastomeric insert 112 which, when in use, may positioned in the joint housing 102 to comprise the elastomeric joint 50 (FIG. 1). This embodiment of the elastomeric insert 112 comprises a cylindrical outer ring 126 and a cylindrical inner ring 124 extending within and parallel to the outer ring 126. The inner ring comprises a channel 132 extending longitudinally therethrough. The inner and outer rings 124, 126 can be connected by supports 128, which in one embodiment extend on opposite sides between the inner and outer rings 124, 126. The connection of the inner and outer rings 124, 126 by the supports 128 creates semi-circular gaps between the facing walls of those rings to define a front gap 130 and a rear gap 131. Extending from the outside surface of the inner ring 124 in the front gap 130 can be a bumper 136 comprising a raised area such as a shoulder or bump, which may be formed as part of the elastomeric insert 112. The bumper 136 extends a portion of the distance between the inner and outer rings 124, 126 within the front gap 130 and provides structural support to the elastomeric insert 112, particularly when the elastomeric joint 50 is experiencing forces due to elevation changes on the conveyor track as described below.

The outside surface of the outer ring 126 can also include a knob 134, which may also be formed as part of the elastomeric insert 112, and is used to securely fit the elastomeric insert 112 in the joint housing 102 as described below.

As shown in FIG. 4A, the cross-sectional width 139 of the outer ring 126 at a front section 138 of the elastomeric insert 112 may be smaller than is the cross-sectional width 137 of the outer ring 126 at a rear section 140. A smaller cross-sectional width 139 for the outer ring 126 at the front section 138 allows for a larger front gap 130 in which to position or form the bumper 136. The elastomeric insert 112 may be made of polyurethane, styrene butadiene, natural rubber, urethane, silicone, neoprene, nitrile butadiene, or other such suitable elastomeric material capable of absorbing and dissipating axial forces.

Figure 4B:
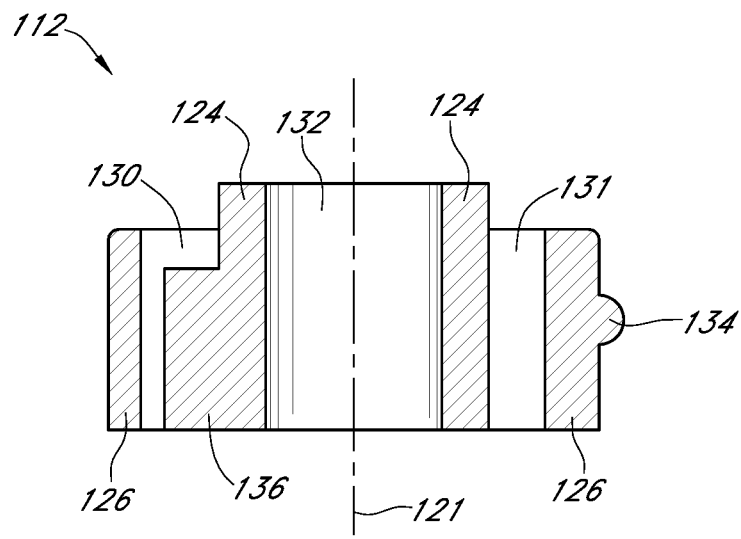
FIG. 4B is cross-sectional side view of the elastomeric insert taken along line 4B of FIG. 4A.

FIG. 4B is a cross-sectional view of the elastomeric insert 112 taken along line 4B of FIG. 4A. Shown in FIG. 4B is the channel 132 formed by the inner ring 124. Also shown are the front gap 130 and the rear gap 131 between the inner ring 124 and the outer ring 126. Also shown are the knob 134 and the bumper 136, the knob 134 extending from the outside surface of the outer ring 126 and the bumper extending from the outside surface of the inner ring 124 and positioned in the front gap 130. The bumper 136 may, however, extend from the outside surface of the inner ring 124 into the rear gap 131, instead of into the front gap 130. Alternatively, the bumper 136 may be configured to extend from the inside surface of the outer ring 126, either in the front or rear gaps 130, 131. The longitudinal length of the inner ring 124 may be configured to be larger than the longitudinal length of the outer ring 126 in order to accommodate placement of the elastomeric insert 112 in the joint housing 102, as discussed below.

Figure 4C:
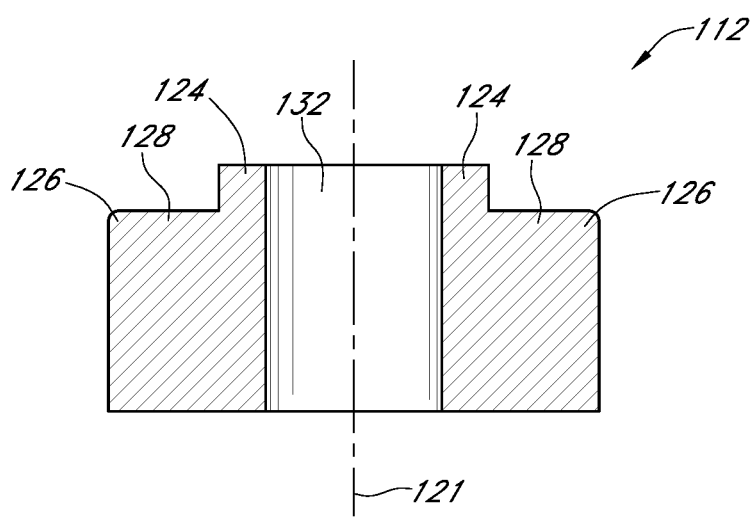
FIG. 4C is cross-sectional side view of the elastomeric insert taken along line 4C of FIG. 4A.

FIG. 4C is a cross-sectional view of the elastomeric insert 112 displayed in FIG. 4A taken along line 4C of FIG. 4A. As seen in FIG. 4C, the outer ring 126 may be attached to the inner ring 124 by the supports 128 on at least two sides. The channel 132 is formed by the inner ring 124.

Figure 5A:
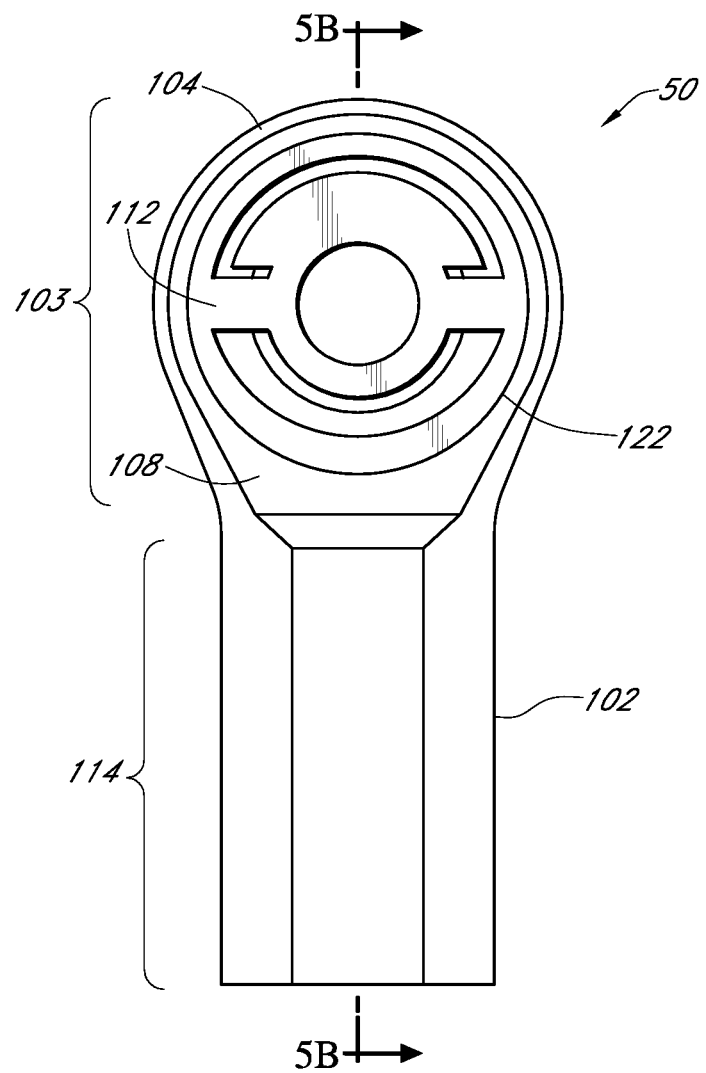
FIG. 5A is a bottom plan view of an embodiment of an elastomeric joint.

FIG. 5A is a bottom plan view of the assembled elastomeric joint 50. The illustrated bottom portion corresponds to the bottom side 49 of the elastomeric joint 50 which is illustrated as facing down towards the track 56 in FIG. 2. The body portion 114 of the joint housing 102 is connected to the annular flange 104 as described in reference to FIG. 3A. The elastomeric insert 112 fits firmly within the counter bore 122 (see FIG. 3B) of the joint housing 102.

Figure 5B:
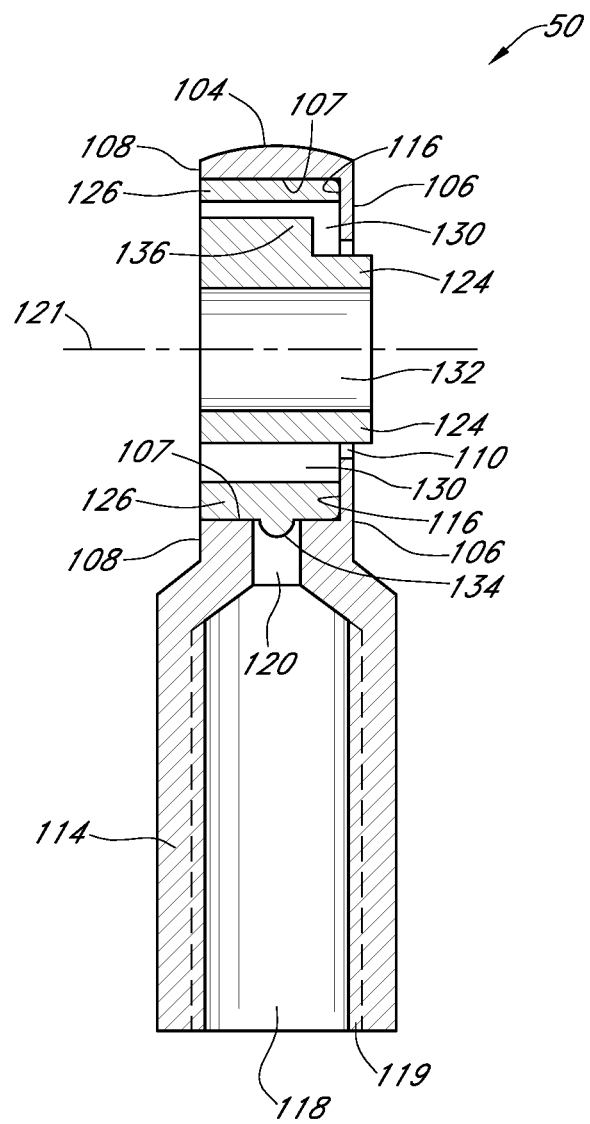
FIG. 5B is a cross-sectional side view of the elastomeric joint taken along line 5B of FIG. 5A.

FIG. 5B is a cross-sectional side view of the assembled elastomeric joint 50 of FIG. 5A taken along line 5B of FIG. 5A. Here, the inner ring 124 includes the channel 132 extending longitudinally therethrough and can include the bumper 136 extending from the outside of the inner ring in the front gap 130. The outer ring 126 fits firmly in the counter bore 122 against the interior walls 107 and top 116 of the counter bore 122. Because the longitudinal length of the inner ring 124 may be configured to be larger than the longitudinal length of the outer ring 126, the inner ring 124 may extend into or through the hole 110 in the annular flange 104. The top surface of the inner ring 124 may be made flush with the top surface 106 of the annular flange 104, or may extend to a height greater than the top 106 of the annular flange 104, thereby extending beyond the plane defined by the top 106 of the annular flange 104. The bottom surface of the inner and outer rings 124, 126 of the elastomeric insert 112 can be flush with the bottom surface 108 of the annular flange 104 or may be slightly recessed into the counter bore 122.

The knob 134 on the outside surface of the outer ring 126 can be fitted into the connecting lumen 120. Positioning the knob 134 in the connecting lumen 120 allows for securement of the elastomeric insert 112 within the counter bore 122. Instead of using a lumen 120, a divot or cut-out may be formed in the back inside wall 117 of the counter bore 122, into which the knob 134 can be placed. In addition to, or instead of, the placement of the knob 134 in the connecting lumen 120, the elastomeric insert 112 may be secured inside the counter bore 122 by use of adhesives or other securement mechanisms.

The elastomeric joint displayed in FIGS. 5A and 5B is configured to mitigate horizontal, axial forces encountered along a curved track in a conveyor system by absorbing and dissipating those forces. When the elastomeric joint 50 is positioned to connect two conveyor carriers as illustrated in FIG. 2, the annular flange 104 of the elastomeric joint 50 is fitted on the vertical post 52 of the front conveyor carrier 58 such that the vertical post 52 extends through the channel 132 in the elastomeric joint 50. The horizontal post 54 on the rear conveyor carrier 60 may be matingly secured in bore 118 in the body portion 114 of the joint housing 102.

As described above, the forces experienced by the carrier units 14 as they travel through a curve are most significant at the ends of the carrier units 14, at their connection points. When the elastomeric joint 50 experiences axial, horizontal forces in entering and exiting curves on the conveyor track, the elastomeric insert 112 is configured to receive and absorb the forces from the vertical post 52. The rigid vertical post 52 transfers the forces it experiences to the elastomeric insert 112. The physical properties of the elastomeric insert 112 allow it to absorb forces within the confines of the counter bore 122. The elastomeric insert 112 can be deformed (such as compressed or stretched) within the counter bore 122 of the annular flange 104 based upon the forces experienced by the conveyor carrier units, particularly at the vertical post 52. As the elastomeric insert 112 is physically deformed in response to the force received, at least a portion of the force is absorbed by the elastomeric insert 112. The elasticity of the elastomeric insert 112 allows it to regain its original shape after being temporarily deformed in response to the forces received from the vertical post 52.

Also, because of the gaps 130, 131 present between the inner and outer rings 124, 126 of the elastomeric insert 112, the elastomeric insert 112 is afforded movement in the fore-aft direction, and the elastomeric insert 112 can adjust temporarily according to the force received. Specifically, the inner ring 124 is able to adjust in the fore-aft direction to absorb the forces placed on the inner ring 124 by the vertical post 52. For example, in response to a force received from the vertical post 52 by elastomeric insert 112 in the aft (rear) direction the inner ring 124 will adjust temporarily by moving or bending towards the rear 140 of the elastomeric insert 112, partially filling in the space provided by the rear gap 131. Again, the elasticity of the elastomeric insert 112 allows it to regain its original shape after being temporarily adjusted in response to the forces received from the vertical post 52.

The fore-aft adjustment of the elastomeric insert 112 within the counter bore 122, along with the force-dissipating material properties of the elastomeric insert 112, allows the elastomeric joint 50 to successfully absorb and dissipate the horizontal forces experienced by the conveyor train in traveling through a curve. In this manner, the elastomeric joint 50 is capable of keeping the conveyor train taut. That is, by absorbing and dissipating the axial forces experienced by the conveyor units at the joints, the elastomeric joint 50 is also configured to maintain a substantially constant pressure and speed among conveyor units traveling through the curve. Maintaining a constant pressure and speed consequently prevents the dissipation of any forces that are received in the curve through the rest of the conveyor train.

The bumper 136 positioned in the front gap 130 is particularly suited for dissipating and absorbing forces experienced by the joints when a conveyor train is traveling up and down an inclined conveyor track. The bumper 136 assists in dissipating and absorbing drag forces experienced by the joints by limiting the amount of fore-aft adjustment experienced by the elastomeric insert 112. As a conveyor train travels up an incline, the front 138 of the elastomeric insert 112 will receive a majority of the force applied by the vertical post 52. The inner ring 124 will adjust towards the fore (front side, 138) to compensate for the received force. However, if the inner ring 124 of the elastomeric insert 112 adjusts too much in the fore direction, the over-adjustment may introduce slack into the conveyor train. Thus, to maintain a substantially constant uniform pressure in the elastomeric joints 50, the bumper 136 is included to prevent the inner ring 124 from adjust too much in the fore direction.

Figure 6:
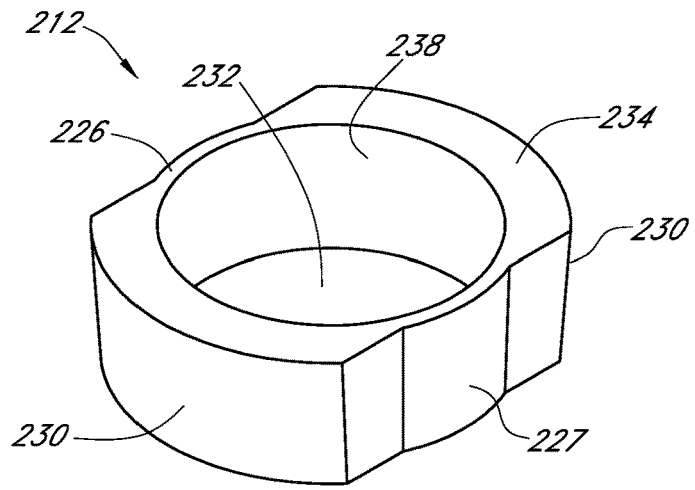
FIG. 6 is a perspective view of an embodiment of an elastomeric insert.

An additional embodiment of an elastomeric insert 212 to be used in an elastomeric joint 50 is displayed in FIG. 6. The elastomeric insert 212 is characterized by a ring having an inside wall 238 and which defines the boundaries of a channel 232 extending therethrough. The elastomeric insert 212 comprises a front side 226 and a rear side 227, as well as lateral sides 230. The thickness of the elastomeric insert 212 between the inside wall 238 and the outer surface is greater in the region defining the lateral sides 230 than it is in the regions comprising the front 226 and rear sides 227. The outside of the elastomeric insert 212 is curved on the lateral sides 230, whereas the outside of the front side 226 and rear side 227 may be flat in portions and may contain a curved section near the middle of the front and rear sides 226, 227. The top 234 and bottom (not displayed in FIG. 6) of the elastomeric insert 212 may be substantially flat. The elastomeric insert 212 may be made of polyurethane, styrene butadiene, natural rubber, urethane, silicone, neoprene, nitrile butadiene, or other such suitable elastomeric material capable of absorbing and dissipating axial forces.

Figure 7:
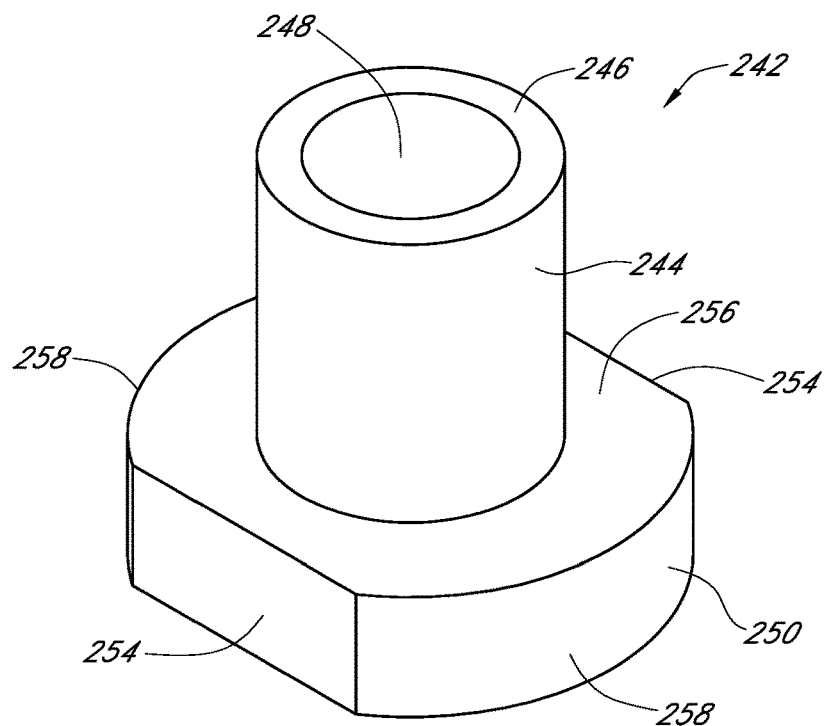
FIG. 7 is a perspective view of an embodiment of a bearing for use in an elastomeric joint.

FIG. 7 is a perspective view of an embodiment of a bearing 242 for use in an elastomeric joint 50. The bearing 242 is comprised of a tubular portion 244 having a top 246, with a channel 248 extending therethrough. The tubular portion 244 is positioned on a top surface 256 of a base portion 250. The channel 248 formed by the tubular portion 244 extends through the base portion 250 of the bearing 242. The base portion 250 may have two curved sides 258, two flat sides 254, a flat top portion 256 and a flat bottom portion (not shown in FIG. 7). The bearing 242 may be made of sintered or solid metal, plastic, phenolic resin, ceramic materials, etc.

When this embodiment of the elastomeric joint 50 is assembled, the elastomeric insert 212 and the bearing 242 are placed together in the counter bore 122 of the joint housing 102. To configure the elastomeric insert 212 and bearing 242 in the counter bore 122, the elastomeric insert 212 is placed around the tubular portion 244 of the bearing 242. The tubular portion 244 is configured to extend through the channel 232 of the elastomeric insert 212 and the bottom of the elastomeric insert 212 is configured to rest on the top portion 256 of the base 250 of the bearing 242.

Figure 8A:
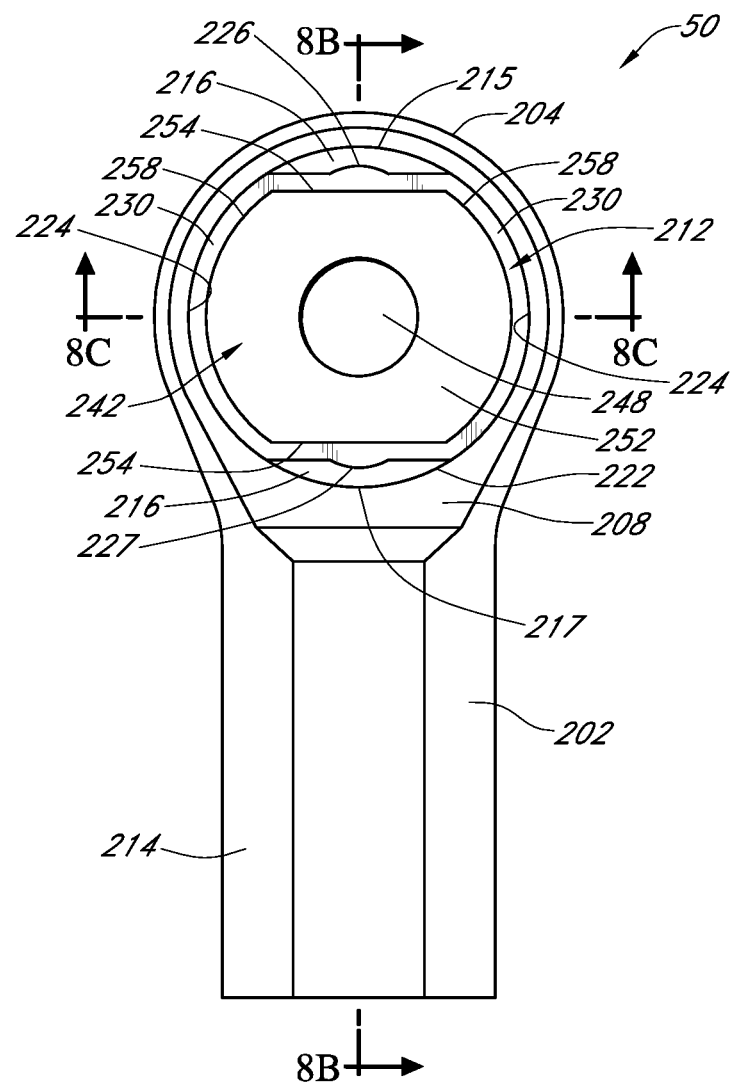
FIG. 8A is bottom plan view of an embodiment of an elastomeric joint.
Figure 8B:
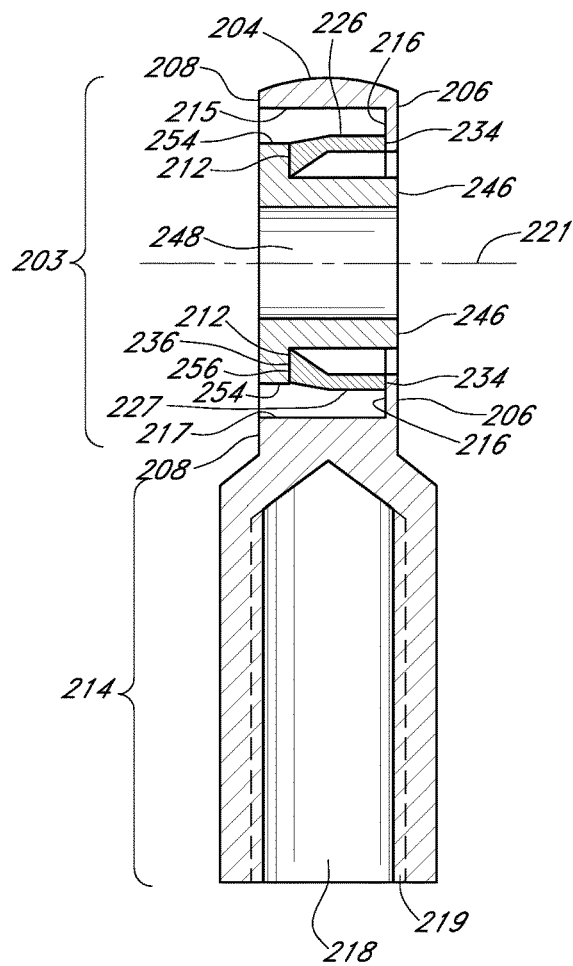
FIG. 8B is a cross-sectional side view of the elastomeric joint taken along line 8B of FIG. 8A.
Figure 8C:
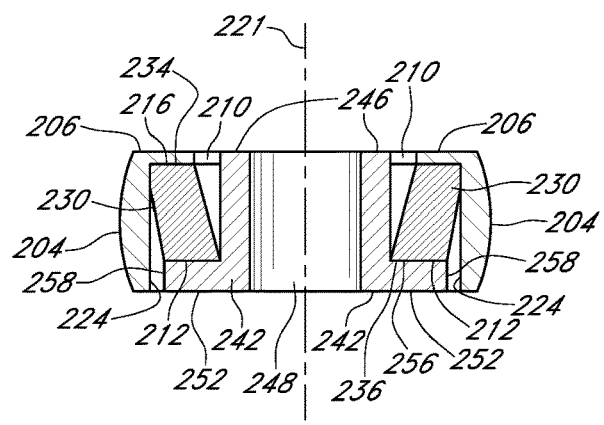
FIG. 8C is a cross-sectional side view of the elastomeric joint taken along line 8C of FIG. 8A.

FIGS. 8A, 8B, and 8C provide views of an embodiment of an elastomeric joint 50 in which the elastomeric joint 50 includes a joint housing 202, the elastomeric insert 212, and the bearing 242. FIG. 8A shows the bottom view of an embodiment of an elastomeric joint 50, such that the bottom corresponds to the side of the elastomeric joint 50 facing down towards the track 56 in FIG. 2. FIG. 8B provides a cross-sectional side view of the elastomeric joint 50 displayed in FIG. 8A, taken along line 8B of FIG. 8A. FIG. 8C provides a cross-sectional front view of the elastomeric joint displayed in FIG. 8A, taken along line 8C in FIG. 8A. These cross-sectional views provide additional perspective of the spatial arrangement of the elastomeric insert 212 and the bearing 242 within the counter bore 222 of the annular flange 204.

In particular, it is seen that the bearing 242 and elastomeric insert 212 are positioned in the counter bore 222 of the annular flange 204 of the joint housing 202; the joint housing 202, the elastomeric insert 212, and the bearing 242 together comprising the elastomeric joint 50. The joint housing 202 is comprised of the body 214 and the annular flange 204. The lateral sides 230 of the elastomeric insert 212 are positioned firmly against the side walls 224 of the counter bore 222. As described above with reference to FIGS. 6 and 7, the tubular portion 244 of the bearing 242 is positioned through the channel 232 of the elastomeric insert 212. The curved sides 258 of the bearing 242 are positioned in the direction of the side walls 224 of the counter bore 222 and the flat sides 254 are positioned in the direction of the front and rear interior walls 215, 217 of the counter bore 222. Arranged in this manner, when the elastomeric joint 50 is in a quiescent state and no forces are applied to the elastomeric joint 50, the front 226 of the elastomeric insert 212 is spaced apart from the front inside wall 215 of the counter bore 222 and the rear of the elastomeric insert 212 is spaced apart from the rear inside wall 217 of the counter bore 222. Thus, viewed from below, as in FIG. 8A, the top 216 of the counter bore 222 may be visible on the front and back sides of the annular flange 204 and the channel 248 in the bearing 242 is centered in the annular flange 204.

The bottom portion 236 of the elastomeric insert 212 may be bonded or otherwise secured to the top 256 of the base portion 250 of the bearing 242. The top portion 234 of the elastomeric insert 212, likewise, may be bonded or otherwise secured to the top 216 of the counter bore 222 in the annular flange 204 of the joint housing 202. By bonding the elastomeric insert 212 to the bearing 242, and bonding the bearing 242 to the counter bore 222, the elastomeric insert 212 and the bearing 242 are secured in the counter bore 222 and are secured to each other. Yet, the elastomeric insert 212 and the bearing 242 are afforded a measure of fore-aft movement within the counter bore 222 by virtue of the gaps present between the elastomeric insert 212 and the front and rear interior walls 215, 217 of the counter bore 212.

When the elastomeric joint 50 is used to connect two conveyor carriers, the vertical post 52 on the front conveyor carrier 58 is placed through the channel 248 of the bearing 242 and the horizontal post 54 on the rear conveyor carrier 60 is secured in the bore 218 in the body 214 of the joint housing 202. When the elastomeric joint 50 experiences axial horizontal forces while entering and exiting curves on the conveyor track 56, the forces experienced at the vertical post 52 are transferred to the elastomeric insert 212 and bearing 242. Because of the existence of the gaps present between the elastomeric insert 212 and the front and rear walls 215, 217 of the counter bore 212, the elastomeric insert 212 and the bearing 242 are afforded movement in the fore-aft direction. This fore-aft movement of the elements within the counter bore 222, along with the force-dissipating material properties of the elastomeric insert 212, allows the elastomeric joint 50 to successfully absorb and dissipate the horizontal forces experienced by the conveyor train in traveling through the curve.

Another advantage of the elastomeric joints disclosed herein includes the dissipation of rotational forces encountered by the conveyor train as one conveyor carrier is banked while a connected conveyor carrier remains flat. For example, when a front conveyor carrier enters a banked portion of the track, the rear conveyor carrier attached behind the front conveyor carrier is still traveling on a flat portion of the track. Such twisting creates rotational forces focused at the joints connecting the conveyor carriers. The rigid, non-elastomeric joints used historically in conveyor systems would propagate these forces through the conveyor train, creating structural stress to the entire conveyor system. The elastomeric joints disclosed herein are configured to absorb and dissipate these rotational forces.

Another advantage of the elastomeric joints disclosed herein includes the dissipation of vertical forces encountered by the joints connecting conveyor carriers as one conveyor carrier is inclined to begin travel up an inclined portion of the conveyor track while a connected conveyor carrier is flat.

The embodiments described herein disclose elastomeric joints which dissipate horizontal, rotational, and vertical forces. The efficient dissipation of forces by the elastomeric joints described herein reduces damage to the conveyor joints, the conveyor carriers, and the tracks, and also reduces noise emanating from the conveyor system. Furthermore, because of the reduced damage, the embodiments of the elastomeric joints described herein reduce conveyor system stoppage time, allowing for longer uninterrupted operation of the conveyor system.

Although illustrated within the context of a conveyor system, embodiments of the disclosure may also be used in other applications. It will be understood by those of skill in the art that numerous and various modifications can be made without departing from the spirit of the development. Therefore, it should be clearly understood that the forms of the development described herein are illustrative only and are not intended to limit the scope of the development.

What is claimed is:

1. A joint for connecting carrier units, the joint comprising:
   an elastomeric joint connected to a first carrier unit and a second carrier unit, the elastomeric joint comprising:
      a joint housing;
      an elastomeric insert positioned inside a bore in the joint housing, wherein the elastomeric insert comprises:
         an outer ring;
         an inner ring disposed concentrically within the outer ring, the inner ring connected to the outer ring by one or more supports, a front gap and a rear gap being formed between the inner ring and the outer ring; and
      a bumper disposed in the front gap, the bumper connected to a portion of the inner ring;
   wherein the joint housing and the elastomeric insert are configured such that a force received on one of the first or second carrier units is dissipated in the elastomeric joint.

2. The joint for connecting carrier units as recited in claim 1, wherein the elastomeric joint comprises:
   an annular flange mechanically connected to a first post on the first carrier such that forces received at the first post are communicated to the annular flange; and
   a longitudinal bore mechanically connected to a second post on the second carrier such that forces received at the second post are communicated to the longitudinal bore.

3. The joint for connecting carrier units as recited in claim 2, wherein the elastomeric insert is configured to elastically adjust its position within the joint housing so as to dissipate and absorb the forces communicated from the first and second posts.

4. The joint for connecting carrier units as recited in claim 2, further comprising a plurality of carrier units connected to a plurality of elastomeric joints, wherein the plurality of carrier units comprise a carrier train.

5. The joint for connecting carrier units as recited in claim 4, wherein the forces received are a result of the carrier train traveling in a curve.

6. The joint for connecting carrier units as recited in claim 4, wherein the forces received are a result of the carrier train traveling on an incline.

7. The joint for connecting carrier units as recited in claim 4, wherein the carrier train comprises a part of a conveyor system.

8. The joint for connecting carrier units as recited in claim 1, wherein the inner ring and the supports are configured to deform into the front gap or the rear gap in response to the force, so as to dissipate the force.

9. The joint for connecting carrier units as recited in claim 1, wherein the inner ring is configured to deform into the front gap so as to move the bumper into contact with the outer ring, to dissipate the force.

10. The joint for connecting carrier units as recited in claim 9, wherein moving the bumper into contact with the outer ring comprises deforming the bumper against an inner surface of the outer ring to limit movement of the inner ring.

* * * * *